United States Patent [19]

Erickson

[11] Patent Number: 4,536,643
[45] Date of Patent: Aug. 20, 1985

[54] FOOD DEHYDRATOR

[75] Inventor: Chad S. Erickson, Maple Grove, Minn.

[73] Assignee: Alternative Pioneering Systems Inc., Minneapolis, Minn.

[21] Appl. No.: 486,815

[22] Filed: Apr. 20, 1983

[51] Int. Cl.³ .............................................. F26B 23/06
[52] U.S. Cl. .................................. 219/400; 219/386; 219/521; 34/197
[58] Field of Search ............... 219/400, 385, 386, 387, 219/521; 34/195, 196, 197

[56] References Cited

U.S. PATENT DOCUMENTS

| | | | |
|---|---|---|---|
| 1,301,286 | 4/1919 | Little | 34/195 |
| 1,478,879 | 12/1923 | Nichols | 34/195 |
| 1,986,088 | 1/1935 | Wild | 219/400 |
| 2,688,808 | 9/1954 | Ipsen | 219/400 |
| 3,610,884 | 10/1971 | Evans | 219/386 |
| 4,132,216 | 1/1979 | Guibert | 219/400 |
| 4,190,965 | 3/1980 | Erickson | 219/400 |
| 4,192,081 | 3/1980 | Erickson | 34/225 |
| 4,236,063 | 11/1980 | Glucksman | 219/400 |
| 4,380,127 | 4/1983 | Roberts | 34/197 |

Primary Examiner—Roy N. Envall, Jr.
Assistant Examiner—Teresa J. Walberg
Attorney, Agent, or Firm—Merchant, Gould, Smith, Edell, Welter & Schmidt

[57] ABSTRACT

The present food dehydrator may be substantially cylindrical in shape including a base member, a plurality of stackable trays, and a top. The base member has a first chamber adapted for receipt of a heater element for convection air distribution and a second chamber adapted for receipt of a heating element suitable for forced air distribution. The base member further includes a chamber adapted for receipt of an electric fan motor. The dehydrator is convertible between a convection heating made and a forced air heating made by selectively mounting the convection heating element and the forced air heating element in their respective chambers.

7 Claims, 6 Drawing Figures

FOOD DEHYDRATOR

The present invention relates to the dehydration of food and other materials and more particularly to apparatus for dehydrating such materials, the apparatus being convertible from convection air distribution to forced air distribution.

BACKGROUND OF THE PRIOR ART

The preservation of materials such as food by dehydration is a very old art. Early dehydration was carried out by placing the material in an open area exposed to sunlight. Early man may have noted that dehydration took place more rapidly on windy days. Recently, mechanical food dehydrators have been developed. Known food dehydrators typically include a plurality of shelves placed within some type of cabinet. Some of the present day food dehydrators utilize convection current for moving the air through the dehydrator. For example, such dehydrators may comprise a cabinet having a light bulb in a lower portion there of. The cabinet has a plurality of shelves superimposed over the light bulb. As the light bulb heats air, the air rises through the trays carrying away the moisture. Such dehydrators are effective, however, they are slower in operation than the forced air dehydrators such as those illustrated in U.S. Pat. Nos. 4,190,965 and 4,192,081 assigned to Alternative Pioneering Systems, Inc. The forced air dehydrators, however, tend to be more expensive to manufacture and thus of greater initial cost to the consumer.

SUMMARY OF THE PRESENT INVENTION

The present invention provides a food dehydrator which is convertible from convection air distribution to forced air distribution. Thus the purchaser may obtain the present unit initially as a convection unit. After having used the unit for some time and as the need arises for more rapid material dehydration, the consumer may obtain a simple kit to convert the unit into a forced air flow unit.

The present food dehydrator may be substantially cylindrical in shape including a base member, a plurality of stackable trays, and a top. The base member has a first chamber adapted for receipt of a heater element for convection air distribution and a second chamber adapted for receipt of a heating element suitable for forced air distribution. The base member further includes a chamber adapted for receipt of an electric fan motor.

The trays may be provided in the desired number and are stackable one upon another such that during operation as a convection unit, a limited number of trays may be used. Once the unit is converted to forced air distribution, a greater number of trays may be utilized if desired. The trays may include a center hub-like support and an outer circumferential wall. A platform or tray floor extends from the circumferential wall to the hub. The tray floor may be substantially open lattice work structure such that air may move upwardly through each of the trays during convection operation.

The top serves to enclose the uppermost tray and may include mechanism for engagement with the hub of the next lower tray.

BRIEF DESCRIPTION OF THE DRAWINGS

FIG. 5 is an exploded view of a forced air unit; and

DETAILED DESCRIPTION OF THE PREFERRED EMBODIMENT

Figure 1:
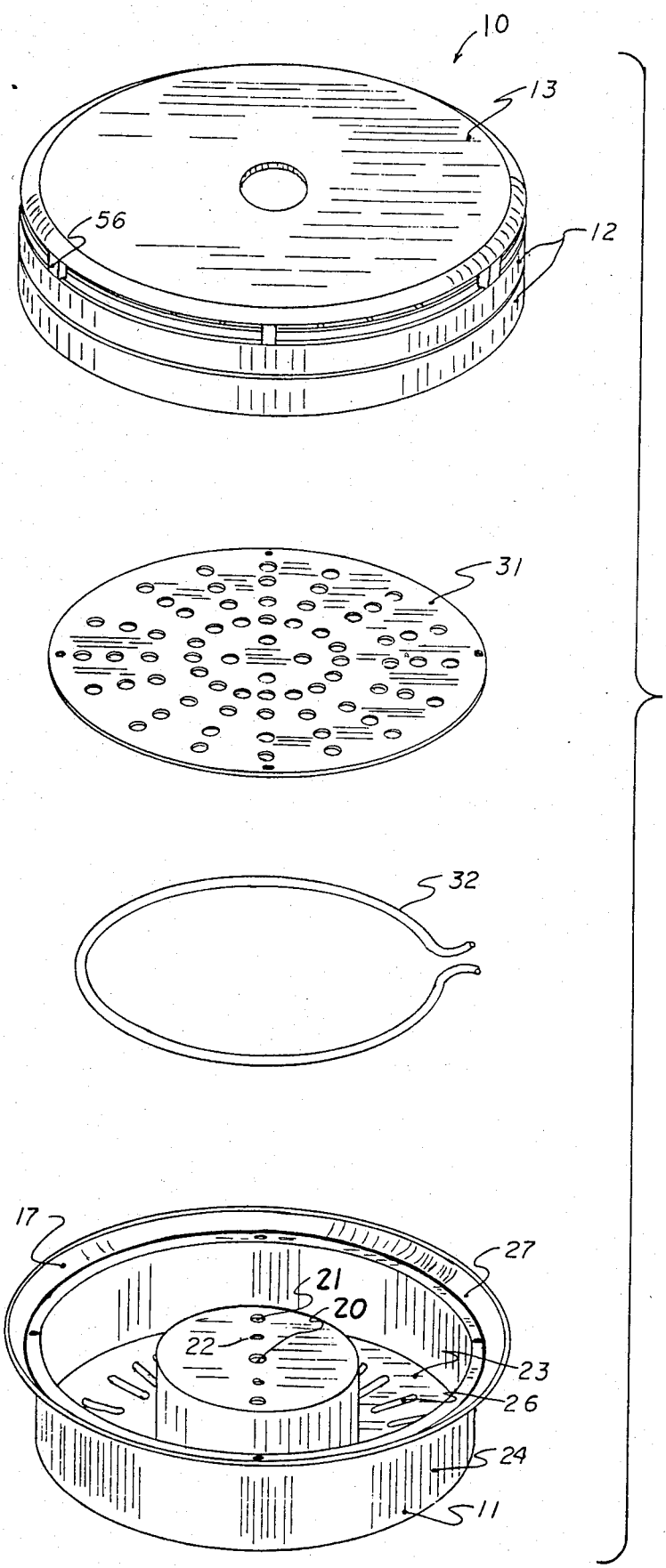
FIG. 1 shows an exploded view of the present invention as a convection unit.

The food dehydrator 10 (FIGS. 1 and 2) has a base member 11, a plurality of trays 12, and a top 13. The base 11, trays 12 and top 13 may be suitably formed of thermal plastic material such as by injection molding techniques.

Figure 2:
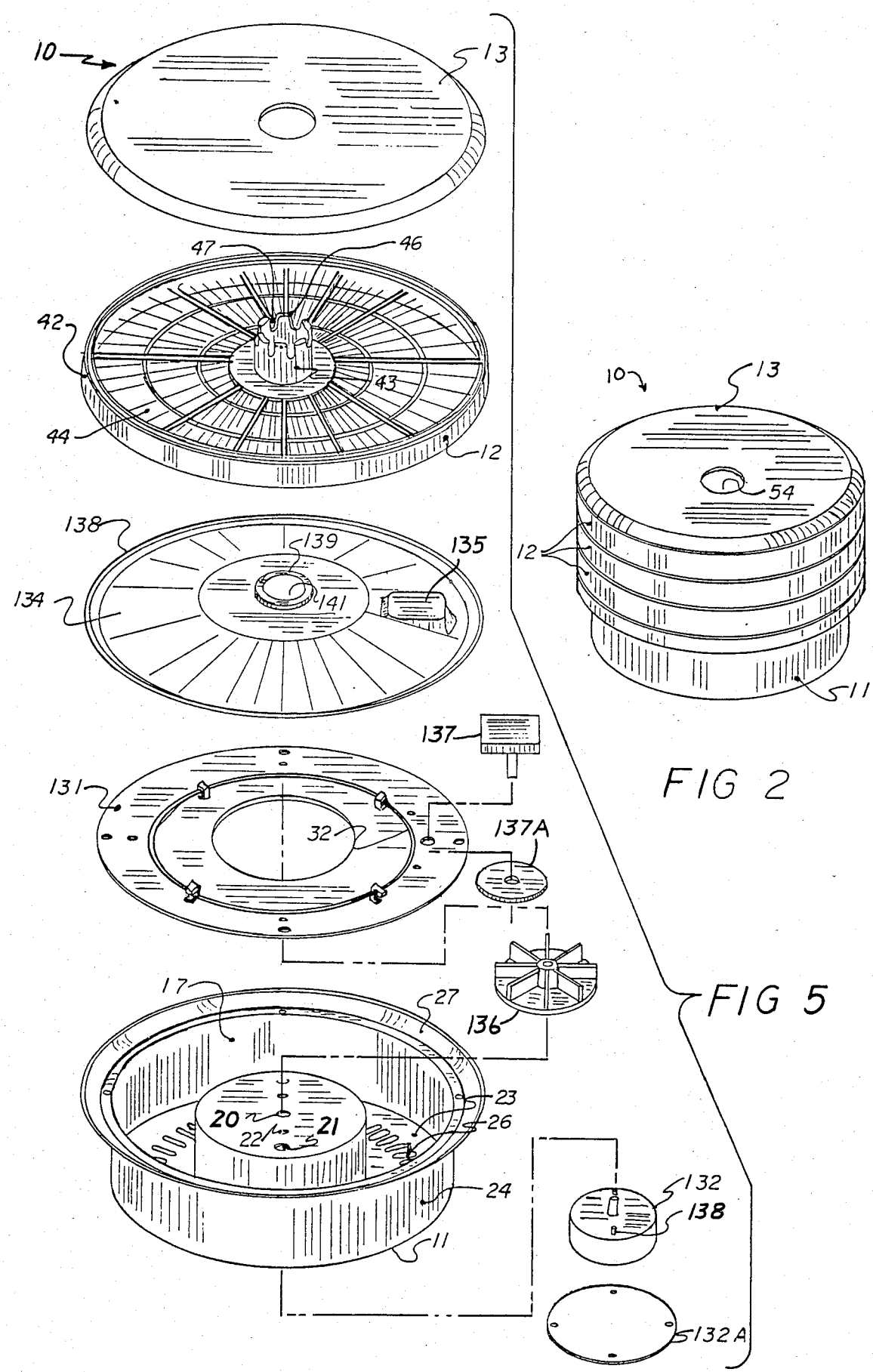
FIG. 2 is a perspective view of the present dehydrator.
Figure 3:
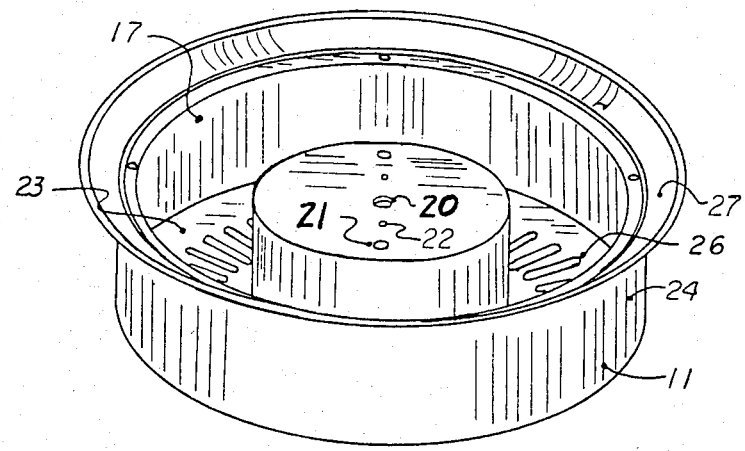
FIG. 3 is a perspective view of the base portion of the dehydrator.
Figure 4:
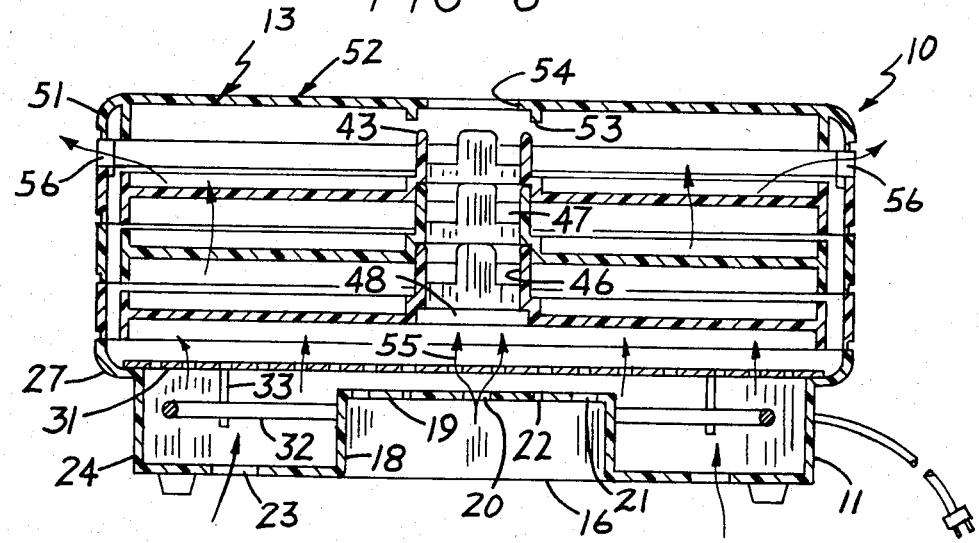
FIG. 4 is a cross-sectional view of the present invention including a convection heating unit.

The base member 11 (FIGS. 1 and 4) includes a wall structure defining a downwardly opening chamber 16 and a wall structure defining an upwardly opening circumferential chamber 17. The chamber 16, for example, may be defined by circumferential wall 18 and upper wall 19. The wall 19 may include a plurality of openings such as 21 and 22 for purposes hereinafter described. The outer chamber 17 is defined by wall 18, bottom wall 23, and the outer circumferential wall 24. The walls 18, 19, 23 and 24 may be integral and may be formed as a single injection molded structure. The bottom wall 23 has a plurality of openings 26 through which air may enter. The wall 24 has an outwardly and upwardly extending lip 27 as shown in FIGS. 1 and 4.

The base member 11 may have a plate 31 secured to the lip 27 of wall 24 by suitable fastening members, e.g., small bolts. The plate 31 desirably is of a heat distributing material such as a metal, e.g., galvanized steel or aluminum sheet material. A heating element 32 may be removably secured to the lower side of plate 31 by suitable fastening devices such as insulated clips 33. Alternatively, element 32 may be supported on the bottom wall 23 with or without the plate being present. The heating element 32 may be of a conventional electrical resistance type and includes suitable wiring for connection to a 110 volt household current. A suitable breaker switch may be provided. It has been found that a heating element of approximately 150 to 200 watts is suitable for the convection heating embodiment of the invention.

The trays 12 are suitable for the support of material to be dehydrated. The trays 12 include an outer circumferential wall 42 and an inner hub 43. The wall 42 may be of a double thickness with an air passageway therebetween. An open web floor 44 extends between wall 42 and hub 43. The floor 44 may be of a plurality of spoke-like portions having sufficient rigidity to carry the weight of the food materials. The hub 43 as shown in FIGS. 1 and 4 has an upper cylindrical portion 46 with a plurality of openings 47 disposed around the upper extremity. The hub has a lower portion 48 sized to snuggly receive the hub 43 of a next lower tray 12. The trays 12 may be suitably formed such as by injection molding.

The dehydrator 10 has a top member 13 for closing the upper side of the dehydrator. The top or cover 13 may be injection molded and has an outer downwardly extending wall 51, an inwardly extending disk-like portion 52 and a center hub 53. The hub 53 is suitable for mating with the upper end of a hub 43. The hub 53 defines an opening 54 through which a certain amount of air may escape. Spacers 56 may be added to cover to allow exhaust air to escape more rapidly around the circumference of cover 13. The spacers may be in the form of clips as shown in FIG. 4. Changing the length of said spacers may serve to regulate the speed of the exhaust air and thereby serve to affect the drying temperature of unit 10.

Although operation of the present invention is apparent from the afore description, it will be further described for purposes of insuring a more complete understanding of the invention. The consumer desiring to dehydrate materials such as food, connects the device to a household outlet. Current is fed to the heating element 32 and heat is produced. The heating element 32 is spaced downwardly about an inch from the disk 31 to facilitate more efficient and rapid flow of air around the element 32 and through the openings in disk 31. The consumer places the food on the various trays prior to or after placing the device in operation. Once the food has been dehydrated, the unit is disconnected and the trays separated for purposes of food removal and cleaning.

Figure 6:
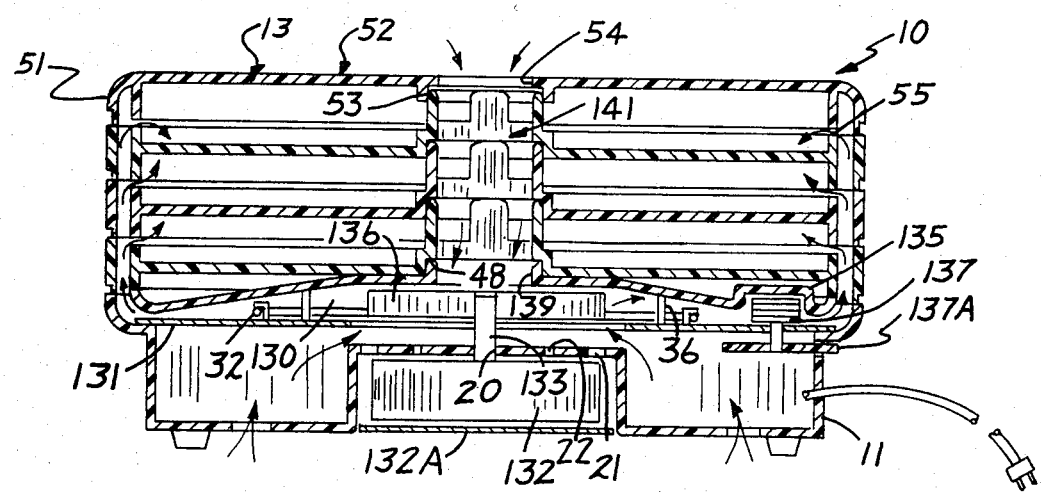
FIG. 6 is a cross-sectional view of the present invention including a forced air heating unit.

The present dehydrator 10 (FIGS. 5 and 6) is convertible to a forced air flow by merely replacing the plate 31 with a unit containing the forced air heating element 131 and adding a blower motor 132 and blower wheel 136. The blower motor 132 is mounted in the downwardly opening chamber 16 with the drive shaft 133 extending through the opening 20. The motor may be secured in place by screws or bolts 134 which extend through the openings 22. Once the shaft 133 is inserted through the opening and the motor is secured in place, a blower wheel 136 may be mounted thereon and held in place with respect to the shaft 133 such as friction on a set screw. The chamber 16 encloses the motor 132 so as to eliminate any possibility of spillage from the trays 12 reaching the motor and gumming up the bearings or shorting such motor out. The encasement is of significance from a saftey standpoint.

A disk-like cover 134 is disposed over the plate 131 and secured thereto by suitable fastening devices such as screw/boss 36. The disk-like structure 134 serves to prevent spillage of material such as food on the heat dissipating plate 131 and serves as the upper wall of a pressurized plenum 130. The disk 134 may have a chamber 135 defined therein for reception of a thermostat 137. Current fed to the dehydrator is controlled by the thermostat 137, thus providing for control of temperature. The outer edge of disk 134 has an upwardly extending lip 138 such that any spillage would be trapped and held much as in a saucer. The disk 134 further includes an inner hub 139 for engagement with the trays 12. The hub 139 defines an opening 141 through which air currents may pass.

The forced air unit operates in a manner somewhat similar to the convection air unit except that the blower wheel 136 developes a pressure differential between plenum 130 and the tray zones. The pressure forces air to flow along the paths shown by arrows 55 in FIG. 6.

A specific embodiment of the present invention has been described, but it should be recognized that a variety of changed and modifications may be made without departing from the present invention. For example, the trays 12 may include removable floors.

What is claimed is:

1. A dehydrator comprising:
a base member, a convection heating unit, a forced air heating unit including a motor driven fan, a plurality of stackable trays and a top, said base defining a pair of heating element chambers, one of said chambers being adapted for reception of said convection air heating unit, the other of said chambers being adapted for receipt of said forced air heating unit, said base including a chamber for reception of said motor-driven fan, said dehydrator being selectively convertible between a convection heating mode and forced air heating mode.

2. A dehydrator comprising:
a heat generating base unit, a plurality of trays stacked on said base unit, a convection heating unit, a forced air heating unit and a top member superimposed on said stacked trays, said base unit including a first chamber and a second chamber, said first chamber being adapted to contain said convection heating unit, said second chamber being adapted to contain said forced air heating unit, said dehydrator being convertible between a convection heating mode and a forced air heating mode by selectively mounting said convection heating unit and said forced air heating unit in their respective chamber.

3. The dehydrator of claim 2 wherein said base unit includes a downwardly opening chamber for mounting of a fan motor.

4. The dehydrator of claim 3 wherein said downwardly opening chamber has an upward side which is enclosed to avoid entrance of fluid from above.

5. The dehydrator of claim 2 wherein said bottom unit includes an upwardly facing reservoir to collect any spillage and thereby prevent materials from directly contacting the forced air heating unit.

6. The dehydrator of claim 2 wherein said dehydrator is in the convection flow mode and wherein a plurality of removable spacer means are provided between said top member and an adjacent of said stacked trays to facilitate exhaust of air.

7. The dehydrator of claim 6 wherein said spacer means comprise clips.

* * * * *